United States Patent
Gervens et al.

(10) Patent No.: US 6,381,459 B1
(45) Date of Patent: Apr. 30, 2002

(54) MOBILE COMMUNICATION SYSTEM, METHOD AND ALTERNATIVE NETWORK GATEWAY UNIT FOR PROCESSING A CALL

(75) Inventors: Norbert Gervens, Herzogenrath; Ola Melander, Wuerselen, both of (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/426,935

(22) Filed: Oct. 22, 1999

(30) Foreign Application Priority Data

Oct. 22, 1998 (EP) .......................................... 98119996

(51) Int. Cl.[7] .................................................. H04Q 7/20
(52) U.S. Cl. .................. 455/445; 455/422; 455/424; 455/428; 370/237; 370/238
(58) Field of Search ............................. 455/445, 422, 455/424, 428; 370/237, 238, 352

(56) References Cited

U.S. PATENT DOCUMENTS

| | | | |
|---|---|---|---|
| 5,504,804 A | | 4/1996 | Widmark et al. .............. 379/63 |
| 5,825,759 A | * | 10/1998 | Liu .............................. 370/331 |
| 5,826,188 A | * | 10/1998 | Tayloe et al. ................ 455/428 |
| 5,862,480 A | * | 1/1999 | Wild et al. ................... 455/13.1 |
| 5,901,352 A | * | 5/1999 | St-Pierre et al. ............. 455/426 |
| 5,915,224 A | * | 6/1999 | Jonsson et al. .......... 379/211.01 |
| 5,920,818 A | * | 7/1999 | Frodigh et al. ............. 370/331 |
| 5,978,368 A | * | 11/1999 | Hjelm et al. ................. 370/347 |
| 6,230,009 B1 | * | 5/2001 | Holmes et al. .............. 455/426 |
| 6,256,300 B1 | * | 7/2001 | Ahmed et al. .............. 370/331 |

FOREIGN PATENT DOCUMENTS

| WO | WO98/32301 | 7/1998 |
|---|---|---|

* cited by examiner

*Primary Examiner*—Daniel Hunter
*Assistant Examiner*—Yemane Woldetatios
(74) *Attorney, Agent, or Firm*—Jenkens & Gilchrist, P.C.

(57) ABSTRACT

A system for processing a call between a mobile services switching centre (MSC) and a gateway mobile switching centre (GMSC) includes a first alternative gateway unit (ANG) being connected to the mobile services switching centre and a second alternative gateway unit (ANG) being connected to the gateway mobile switching centre. A call which is to be processed via an alternative network (AN) is processed directly between the alternative gateway units (ANG). The alternative gateway units (ANG) include means for performing speech and data coding and means to transmit and receive a call to be able to process the call directly via the alternative network, e.g. a Voice-over-IP network.

22 Claims, 3 Drawing Sheets

MOBILE COMMUNICATION SYSTEM, METHOD AND ALTERNATIVE NETWORK GATEWAY UNIT FOR PROCESSING A CALL

BACKGROUND OF THE INVENTION

1. Field of the Invention

The invention relates to a mobile communication system, to a method and to an alternative network gateway unit for processing a call between a mobile services switching centre and a gateway mobile switching centre via an alternative network.

2. Description of the Invention

A gateway mobile switching centre and a mobile services switching centre, which are part of a mobile communication system, e.g. like the GSM system, are able to forward or to receive a call via a network, like an integrated services digital network ISDN or an PSTN. The method for forwarding or receiving the call via such a network and the network gateway unit therefore are specified in the standard of the mobile communication system, e.g. the GSM system or the D-AMPS system. In this environment the ISDN system or the PSTN system is used to relay the call between the mobile services switching centre, which is serving a mobile subscriber and the gateway mobile switching centre, which contains information about the mobile subscriber and which relays the terminating call.

There is no further network known which is specified in the prior art and via which a call could be relayed between the mobile services switching centre and the gateway mobile switching centre. Therefore a call could only be relayed over the networks mentioned and specified in the standards. Therefore it is not possible according to the prior art, to relay the call via an alternative network and to take advantage out of the relaying of a call via such an alternative network.

SUMMARY OF THE INVENTION

Therefore it is an object of the present invention to provide a system, a method and an alternative network gateway unit to process a call via an alternative network.

This is achieved according to the system, subsystem, method, and gateway unit of the present invention.

It is an advantage of the present invention that a call can be routed directly via an alternative network and that a PLMN (Public Land Mobile Network) can directly interwork with and take advantage of routing calls through such alternative networks.

As the number of alternative networks or alternative network parts is increasing and as these networks offer an increasing number of functionality, it is advantageous according to the invention to make use of this functionality.

It is further advantageous that according to the invention a call could be relayed via any upcoming new alternative network. The alternative network gateway unit provides the possibility to adapt to the configuration of the alternative network and to relay calls via such a network.

According to one embodiment it is advantageous to use a Voice-over-IP network, or a FAX-over-IP network, or a Multimedia-over-IP network or a data-over-IP network as an alternative network. These networks advantageously provide a plurality of services in one network and this in an effective and cost efficient way. E.g. the provision of a voice-over-IP network is easy to build up compared to build up a public switched telephone network (PSTN). A reason for this is that different bearer services are integrated and that one single network will be used for data and for speech. Both speech and data is transferred via this one network.

According to another embodiment an alternative network gateway unit is connected to a gateway mobile switching centre or to a mobile services switching centre, which means that said alternative network gateway unit is positioned between the alternative network and the According to another embodiment an alternative network gateway unit is a part of the gateway mobile switching centre or which is part of the mobile services switching centre. This means that the alternative network gateway unit is incorporated into the gateway mobile switching centre or the mobile services switching centre and therefore a new enhanced gateway mobile switching centre or enhanced mobile services switching centre is built up.

According to yet another embodiment the method for processing a call could be advantageously used in a system working according to the GSM standard or according to the D-AMPS standard or according to the UMTS standard.

BRIEF DESCRIPTION OF THE DRAWINGS

In the following the invention will be further described by means of the figures and by means of the description of examples. The following figures are showing.

DETAILED DESCRIPTION OF THE INVENTION

Figure 3:
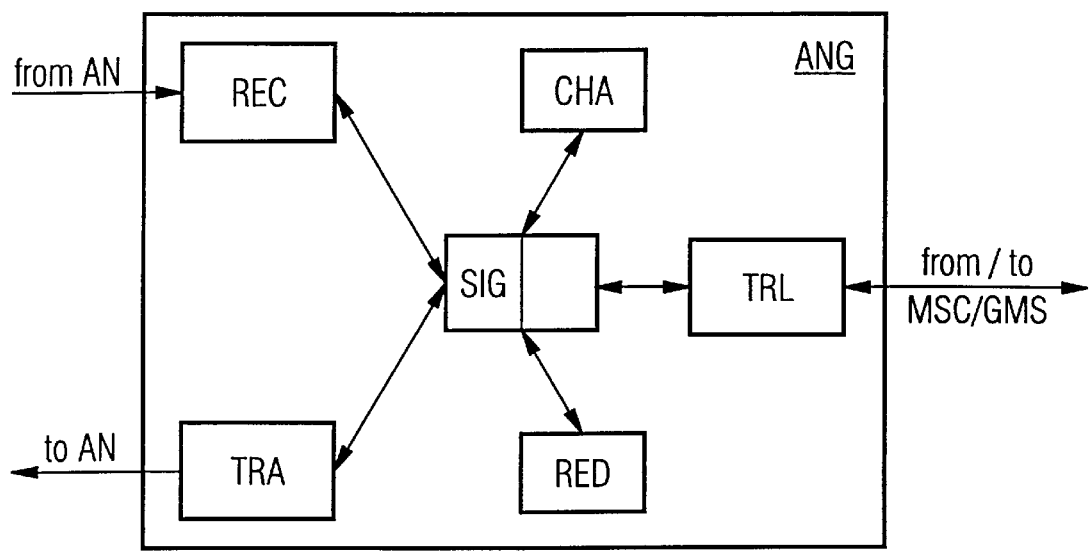
FIG. 3: Illustrated is an exemplary alternative network gateway unit according to the invention.

In the following the invention will be further described by means of FIG. 1 partly with the help of FIG. 3.

A mobile communication system for processing a call consists of a mobile services switching centre MSC and a gateway mobile switching centre GMSC. Further the system includes an alternative network AN via which a call is relayed. A first alternative network gateway unit ANG is connected to the mobile services switching centre MSC. A second alternative network gateway unit ANG is connected to the gateway mobile switching centre GMSC.

It should be mentioned that the system is not restricted to one mobile services switching s centre MSC or gateway mobile switching centre GMSC as a mobile subscriber could be in the area of one or another mobile services switching centre. Only one mobile services switching centre MSC is shown not to overload the figure. Further it should be mentioned that the gateway mobile switching centre as used in this description includes functionality of a mobile services switching centre, too. This should not restrict this invention as it is also applicable if the gateway mobile switching centre provides the gateway functionality only.

Figure 1:
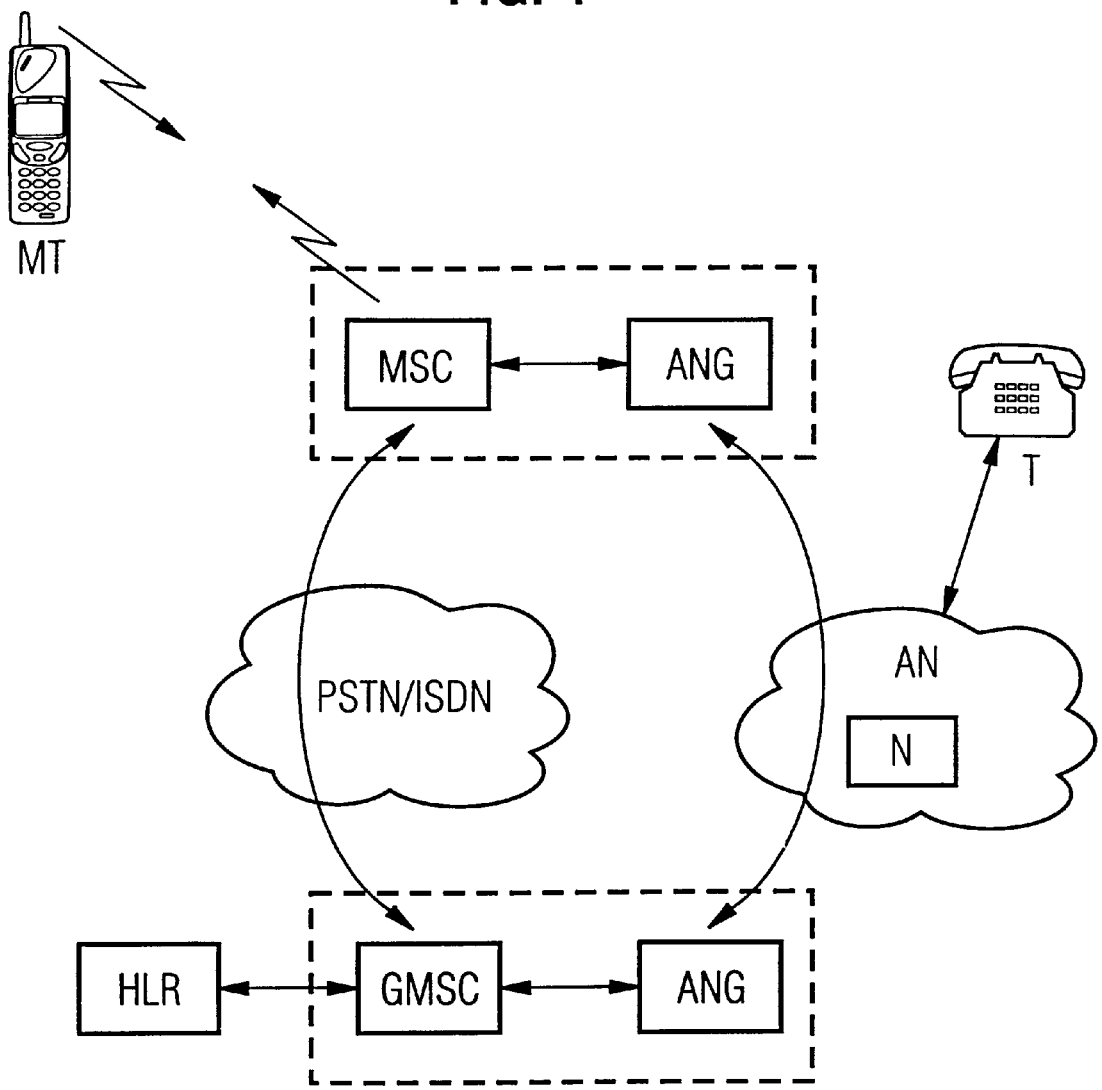
FIG. 1: Illustrated is an exemplary flowchart of a mobile communication system for processing a call via an alternative network.

As shown in the FIG. 1, the alternative network gateway unit ANG is either connected to the gateway mobile switching centre GMSC or is connected to the mobile services switching centre MSC. The alternative network gateway unit ANG could also be part of a new enhanced gateway mobile switching centre or of a new enhanced mobile services switching centre which is shown with the broken line which is drawn around the gateway mobile switching centre GMSC and the alternative network gateway unit ANG and around the mobile services switching centre MSC and the alternative network gateway unit ANG.

The mobile services switching centre MSC is currently serving a mobile subscriber, e.g. having a mobile terminal MT. A mobile terminating call for the mobile terminal MT, which is arriving from a terminal T at the gateway mobile switching centre GMSC is processed directly via the alternative network AN to the mobile services switching centre MSC, currently serving the mobile terminal MT, to arrive at the mobile terminal MT. The call from the terminal T may arrive via the alternative network AN. The processing of the call is performed by the first alternative network gateway unit ANG and by the second alternative network gateway unit ANG whereby the call is processed directly via the alternative network AN. The method for processing will be described in more detail in the following.

In addition the gateway mobile switching centre GMSC is connected to a home location register HLR. The home location register HLR stores subscriber information about the mobile subscriber having the mobile terminal MT. In addition to this the home location register HLR stores information about the current location of the mobile subscriber. This is done by means well known in the area of GSM, D-AMPS or UMTS and therefore will not be part of this description.

In the gateway mobile switching centre GMSC a logic could be foreseen. The logic provides a control functionality to control traffic. This means that a data check is performed which results either in a direct forwarding of an incoming call to an mobile services switching centre MSC via a public switched telephone network PSTN or ISDN network, or in a drop-back of the call. Therefore the gateway mobile switching centre GMSC includes a traffic control logic and means to perform a forwarding.

Further the first and the second alternative network gateway unit ANG of the mobile communication system for processing the call comprises receiving means REC to receive a call from the alternative network AN and transmitting means TRA for transmitting a call to the alternative network AN. A call arriving from the alternative network AN, e.g. from a terminal T being connected to the alternative network AN, arrives at the second alternative network gateway unit ANG and is received from said alternative network gateway unit ANG. If the call is e.g. a mobile terminating call and the mobile subscriber with the mobile terminal MT is not currently located in the area of the gateway mobile switching centre GMSC, the transmitting means TRA in the alternative network gateway unit ANG are able to transmit the call to the alternative network AN, Further there are means for performing network signalling SIG and means COD for performing data and speech coding. As data and speech is relayed via the alternative network AN, coding means are necessary to perform the coding of the speech or any data. In addition to this a signalling has to be performed to build up the connection between the first alternative network gateway unit ANG and the second alternative network gateway unit ANG to be able to relay the call, respectively the speech and the data, via the alternative network.

One additional aspect of the invention is the avoidance of several coding of the speech. A compatibility check between the means COD for performing speech coding at one side, e.g. at the side of the gateway mobile switching centre GMSC, and further means COD for performing speech coding at the other side, e.g. at the side of the mobile services switching centre MSC, is performed. If both means are compatible to each other redundant speech coding should be avoided. This is done by simply avoiding the unnecessary, here the double coding. Therefore a called tandem-free operation is achieved by using an Inband Tandem Free Operation Protocol. This protocol works according to the TS 04.53 standard in the area of GSM and avoids unnecessary coding.

In addition the first and the second alternative network gateway unit comprises means TRL for identifying a mobile subscriber. This means TRL includes external data base look up accesses for checking and translating subscriber identities. Until a call is relayed is has to be made sure that the right subscriber is found and the call is relayed to the right terminal. Therefore the translating means is e.g. translating the subscriber identity out of the PLMN into a subscriber identity in the alternative network AN.

Further the alternative network gateway unit ANG comprises charging means CHA for charging and accounting data used in the alternative network AN or in a PLMN where the alternative network AN is a part of. The charging means could also be used by the gateway mobile switching centre GMSC or instead of charging means in the gateway mobile switching centre GMSC, depending on the implementation.

Further the charging means CHA mentioned above could be used in so called pre-paid services. A pre-paid service is a service where services are paid in advance. Such a service could be either supported by the PLMN network or by the alternative network. In the case of pre-paid services the charging means CHA takes over co-ordinating functions. The charging means CHA co-ordinates a reduction of a prepaid amount of the subscriber who really used this service. Further there are services applicable to pre-paid services where no service charge has to be taken from the pre-paying user, e.g. in case of an operators call or a maintenance call. In this case the charging-means have to take over the co-ordination, too.

The alternative network gateway unit ANG further comprises means RED to drop-back a call received from the alternative network AN back to the alternative network AN.

In the following the use of this means will be described in more detail. As shown in FIG. 1 there is a network node N foreseen in the alternative network AN for performing the drop-back of the call inside the alternative network AN. This will be described in more detail in the further description, too.

The description according to FIG. 1 refers to a mobile terminating call. A mobile terminating call is a call, which is intended to arrive at a mobile terminal, e.g. the mobile terminal MT according to FIG. 1. In the case that such a mobile terminating call arrives via an alternative network AN, e.g. a Voice-over-IP network, and is forwarded to the mobile terminal MT via the Voice-over-IP network, speech is transferred as follows.

It should be mentioned here that there could be one or more further alternative networks involved. A call which arrives via an alternative network could be transferred via another alternative network of the same type or of different type instead of the transfer via the same alternative network. However, only due to a better overview one alternative network is shown and described.

In the following a mobile communication subsystem for processing a call via an alternative network AN will be described (without figure). Such a subsystem consists of an alternative network gateway unit ANG comprising receiving means to receive a call from the alternative network AN and transmitting means to transmit a call to the alternative network AN. In addition a logical unit of a switching centre to instruct the alternative network gateway unit ANG about transmitting or dropping-back the call is included. The alternative network gateway unit ANG takes over the functionality of e.g. dropping-back a call to the alternative network AN or of charging. The logic, which is part of a switching system provides additional functionality of a switching system necessary this way of processing a call. Such a switching system is e.g. a gateway mobile switching centre or a mobile switching centre as mentioned with the other examples.

Figure 2:
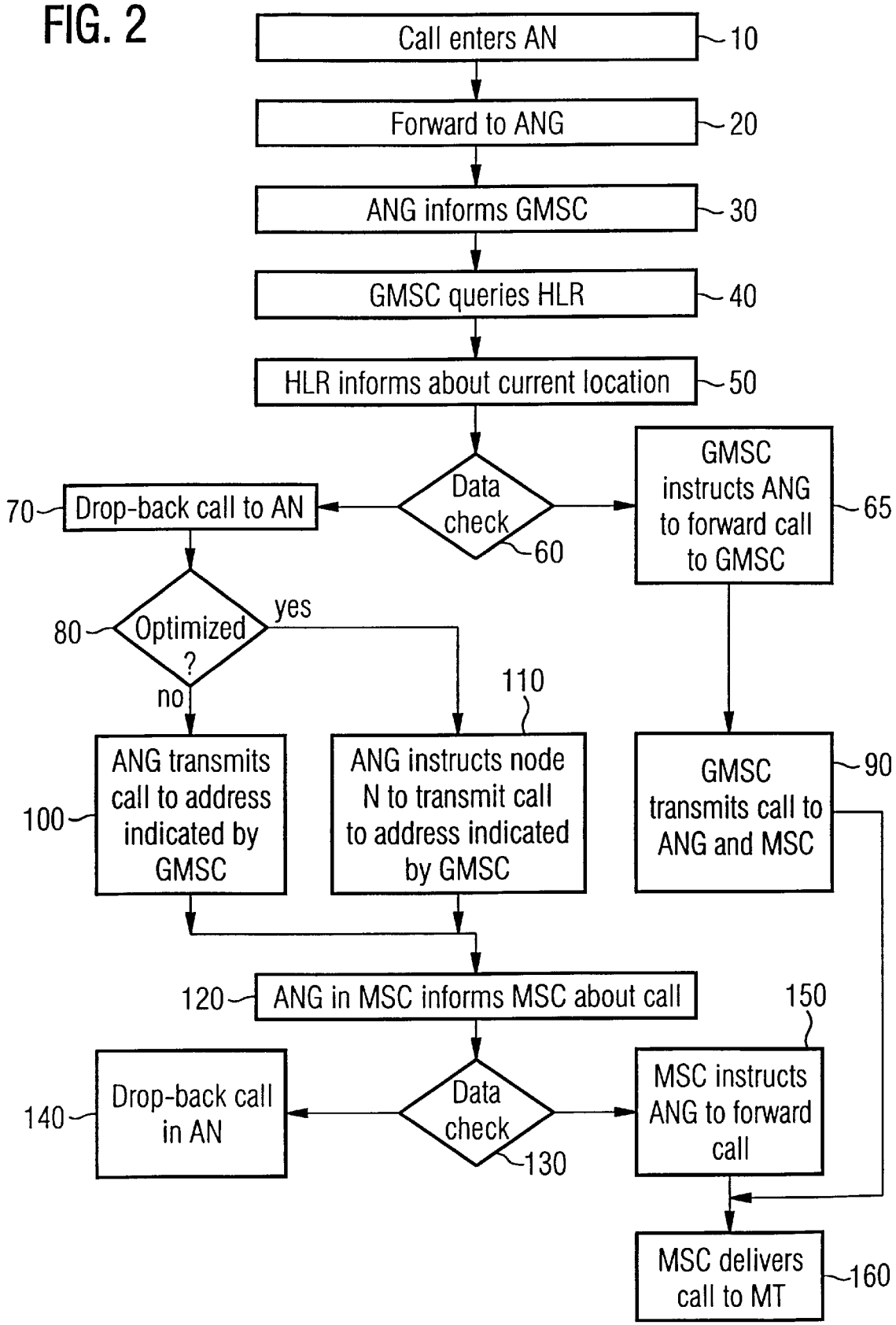
FIG. 2: Illustrated is an exemplary flowchart of the method according to the invention.

In the following a method for processing a call in a cellular communication system will be described by means of FIG. 2.

In a first step 10 a call enters the alternative network AN. The call arrives for example from a terminal T and is for example a mobile terminating call. In a next step 20 the call is forwarded to the second alternative network gateway unit ANG, which is connected to the gateway mobile switching centre GMSC. The second alternative network gateway unit ANG informs in a next step 30 the gateway mobile switching centre that a call for the mobile subscriber MT has arrived and forwards the call to the gateway mobile switching centre GMSC. In a following step 40 the gateway mobile switching centre GMSC queries the home location register HLR for the location of a subscriber to whom the call is terminated. The home location register HLR stores information about the subscriber and about the current location of the subscriber. As already mentioned the mobile subscriber may be in the area of the gateway mobile switching centre GMSC but may also be in the area of any other mobile services switching centre MSC allowed for the mobile subscriber MT. As well known in the area of mobile communication, e.g. in the area of GSM, the home location register contains data about the current location of the mobile subscriber. Therefore the HLR requests a roaming number from the mobile services switching centre MSC currently serving the mobile subscriber MT. Then the roaming number is given to the gateway mobile switching centre GMSC, which means that in next step 50 the home location register HLR informs about the current location of the mobile subscriber to whom the call is wished to be terminated.

In a next step 60 a data check is performed. This explicitly means that the information about the roaming number and the gateway mobile switching centre exchange data is checked. Further to this call related data and subscriber dependent data could be checked at this step. The data check results in two different ways of handling the call.

Depending on the result of the data check, the gateway mobile switching centre GMSC either instructs the second alternative network gateway unit ANG to drop-back the call inside the alternative network AN, step 70, or to forward the call to the gateway mobile switching centre GMSC, step 65. In a next step 90 the gateway mobile switching centre GMSC transmits the call to the mobile services switching centre MSC and the first alternative network gateway unit ANG.

If the call is forwarded to the mobile switching centre MSC and the first alternative network gateway unit ANG, step 90, in the way mentioned above, this is done via a non alternative network like the integrated services digital network ISDN or the public switched telephone system PSTN. In these systems the ways and interfaces are defined according to the standards. Alternatively the call may be forwarded to another destination in the ISDN or PSTN network, depending on the reachability of the mobile subscriber. Another possibility is to invoke announcement or tone sending which is supported by the ISDN or PSTN network to inform the caller about the processing of the call or to inform the caller what happens to the call. This may e.g. be an announcement informing the caller that the call is automatically forwarded to a network in a different area. However, every known announcement or tone sending should be incorporated here, but will not be further described as it is supposed to be done as well known.

If the data check results in a drop-back of the call to the alternative network AN, it is checked in a further step 80 if an optimised drop-back is supported. If no optimisation is supported by the alternative network AN, the alternative network gateway unit ANG transmits the call through the alternative network AN to the address indicated by the gateway mobile switching centre GMSC, step 100.

If the alternative network AN supports drop-back, the second alternative network gateway unit ANG instructs a node N in the alternative network AN instead of the alternative network gateway unit, to transmit the call to the address indicated by the gateway mobile switching centre GMSC, step 110.

In addition to this and not shown in the figure, the second alternative network gateway unit ANG is able to directly drop-back the call to the alternative network without informing the gateway mobile switching centre GMSC.

After step 100 or after step 110 the call is arriving at the first alternative network gateway unit ANG. Therefore in a step 120 the first alternative network gateway unit ANG which is connected to the mobile services switching centre MSC, informs said mobile services switching centre MSC about the incoming call.

In a next step 130 a data check is performed. The data check checks the subscriber data, the exchange data, and the subscriber reachability.

Based on this data and the result of the data check, the call is in one further step 140 drop-back to the alternative network AN. This could be performed if the outcome of the data check is that the subscriber is not reachable.

In another step 150, if the subscriber is reachable, the mobile services switching centre MSC instructs the first alternative network unit ANG where the call was delivered to, to forward the call. In a next step 160 the mobile services switching centre MSC delivers the call to the mobile subscriber, e.g. to the mobile terminal MT.

If the call is drop-back inside the alternative network AN, the alternative network gateway unit ANG either drop-back the call itself or instructs the node N in the alternative network AN to drop-back the call. The last possibility implies that optimised drop-back is supported by the alternative network AN.

In the following a possible use of the method and of the system is described (without figure).

A subscriber having a telephone T, e.g. a plain old telephone wishes to call a mobile subscriber having a mobile terminal MT. The subscriber having the telephone T is connected to the alternative network AN and performs the call via this network. The subscriber with the mobile terminal MT is in general connected to the gateway mobile switching centre GMSC. In a home location register HLR connected thereto, subscriber data and information about the mobile subscriber is stored. The mobile subscriber with the mobile terminal MT is currently not close to his home location. The subscriber is currently in the area of another mobile services switching centre MSC. The ways of registering in the area of another mobile services switching centre MSC is performed according to methods well known in the area of GSM, D-AMPS etc. However, it should be pointed out that information about the current location of the mobile subscriber, roaming number, etc. are available at the home location register HLR connected to the gateway mobile switching centre GMSC.

The call from the terminal T arrives at the second alternative network gateway unit ANG as this is the gateway unit where the mobile subscriber is expected to be reachable and the alternative network gateway unit ANG is foreseen between the alternative network AN and the gateway mobile switching centre GMSC. As already mentioned above the second alternative network gateway unit ANG informs the gateway mobile switching centre GMSC about the incoming call. Then the home location register HLR is queried about information about the current location of the mobile subscriber. As the mobile services switching centre MSC is currently serving the mobile subscriber, respectively the mobile terminal, a roaming number is requested from it.

After the roaming number is available the call is directly relayed via the alternative network AN. Therefore the gateway mobile switching centre GMSC instructs the second alternative network gateway unit ANG to drop-back the call into the alternative network AN. Then the call is drop-back to the address indicated by the gateway mobile switching centre GMSC.

The first alternative network gateway unit ANG receives the call and informs the mobile services switching centre MSC about the incoming call. If the mobile subscriber is still in the area of this mobile services switching centre, the call is delivered to the subscriber, respectively to the mobile terminal MT and the connection is established.

If the mobile subscriber is no longer in the area of the mobile services switching centre the call may be drop-back again to the alternative network AN to be relayed to a further alternative network gateway unit ANG (not shown in the figures).

The alternative network AN is possibly a Voice-over-IP network, or a FAX-over-IP network, or a Multimedia-over-IP network or a data-over-IP network.

In the following an alternative network gateway unit ANG is described in more detail by means of FIG. 3.

The alternative network gateway unit ANG for processing a call directly via an alternative network AN consists of receiving means REC which are able to receive a call from an alternative network AN. Further the alternative network gateway unit ANG includes transmitting means TRA for transmitting a call to the alternative network AN.

In addition the alternative network gateway unit consists of means SIG for performing network signalling and for performing speech and date coding and of means TRL for identifying a mobile subscriber. Further to this there are charging-means CHA for charging and accounting data used in the alternative network AN.

Further there are means RED to drop-back a call received from the alternative network AN back to the alternative network.

The alternative network gateway unit ANG is connected to a gateway mobile switching centre GMSC and is located between said gateway mobile switching centre GMSC and the alternative network AN. Another alternative network gateway unit ANG is located between a mobile services switching centre MSC and the alternative network AN.

As mentioned above the method and the alternative network gateway unit ANG are used for processing a call in a cellular communication system. The cellular system mentioned is e.g. a system according to the GSM standard.

Another cellular communication system wherein the method and the alternative network gateway unit is used is a cellular system according to the D-AMPS standard.

Another cellular communication system wherein the method and the alternative network gateway unit is used is a cellular system according to the PDC standard or one working according to the UMTS standard.

Although preferred embodiment(s) of the method, system, and apparatus of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A mobile communication system for processing a call between a mobile services switching centre and a gateway mobile switching centre via an alternative network, comprising:
   a mobile services switching centre that serves a mobile subscriber;
   a gateway mobile switching centre;
   a first alternative network gateway unit connected to the mobile services switching centre;
   a second alternative network gateway unit connected to the gateway mobile switching centre; and
   wherein the first and the second alternative network gateway units are adapted to process a call directly via an alternative network.

2. The mobile communication system according to claim 1, wherein the first and the second alternative network gateway units comprise:
   receiving means to receive a call from the alternative network; and
   transmitting means to transmit a call to the alternative network.

3. The mobile communication system according to claim 1, wherein at least one of the first and the second alternative network gateway units comprise:
   means for performing network signalling.

4. The mobile communication system according to claim 1, wherein at least one of the first and the second alternative network gateway units comprise:
   means for performing speech and data coding.

5. The mobile communication system according to claim 1, wherein at least one of the first and the second alternative network gateway units comprise:
   means for identifying a mobile subscriber.

6. The mobile communication system according to claim 1, wherein at least one of the first and the second alternative network gateway units comprise:
   charging-means for handling charging and accounting data used in the alternative network.

7. The mobile communication system according to claim 1, wherein at least one of the first and the second alternative network gateway units comprise:
   means to redirect a call received from the alternative network back to the alternative network.

8. The mobile communication system according to claim 7, wherein the alternative network comprises at least one network node for drop-back of the call inside the alternative network.

9. The mobile communication system according to claim 1, wherein the alternative network comprises at least one of a Voice-over-Internet Protocol (IP) network, a FAX-over-IP network, a Multimedia-over-IP network, and a data-over-IP network.

10. A mobile communication subsystem for processing a call via an alternative network, comprising:

an alternative network gateway unit, the alternative network gateway unit including a receiving unit to receive a call from the alternative network and a transmitting unit to transmit a call to the alternative network; and a logical unit of a switching centre to instruct the alternative network gateway unit regarding transmitting or dropping-back of the call.

11. A method for processing a call in a wireless communication system between a mobile services switching centre and a gateway mobile switching centre via an alternative network, comprising the steps of:

providing a first alternative network gateway unit connected to the mobile services switching centre;

providing a second alternative network gateway unit connected to the gateway mobile switching centre; and processing a call directly via the alternative network using the first and the second alternative network gateway units.

12. The method according to claim 11, further comprising the steps of:

forwarding a call received by the alternative network to the second alternative network gateway unit;

informing the gateway mobile switching centre about the call;

querying a home location register to acquire information about a current location of a mobile subscriber being called;

instructing the second alternative network gateway unit to forward the call to the gateway mobile switching centre;

transmitting the call from the gateway mobile switching centre to another location, the another location including the first alternative network gateway unit and the mobile services switching centre; and delivering the call from the mobile services switching centre to the mobile subscriber.

13. The method according to claim 11, further comprising the steps of:

forwarding a call received by the alternative network to the second alternative network gateway unit;

informing the gateway mobile switching centre about the call;

querying a home location register to acquire information about a current location of a mobile subscriber being called;

dropping-back the call to the alternative network;

transmitting the call from the second alternative network gateway unit to an address indicated by the gateway mobile switching centre;

informing the mobile services switching centre about the call;

instructing the first alternative network gateway unit to forward the call; and delivering the call from the mobile services switching centre to the mobile subscriber.

14. The method according to claim 13, further comprising at least one of the steps of:

dropping-back of the call by the alternative network; and instructing, by the second alternative network gateway unit, a node to transmit the call to an address indicated by the gateway mobile switching centre.

15. The method according to claim 11, wherein the step of processing further comprises the step of:

transmitting, by the second alternative network gateway unit, the call directly through the alternative network to an address indicated by the gateway mobile switching centre.

16. The method for processing a call in a wireless communication system according to claim 11, wherein the wireless communication system comprises a system operating in accordance with the Global System for Mobile Communications (GSM) standard.

17. The method for processing a call in a wireless communication system according to claim 11, wherein the wireless communication system comprises a system operating in accordance with the Digital-Advanced Mobile Phone System (D-AMPS) standard.

18. The method for processing a call in a wireless communication system according to claim 11, wherein the wireless communication system comprises a system operating in accordance with Universal Mobile Telecommunications System (UMTS) standard.

19. An alternative network gateway unit for processing a call directly via an alternative network, comprising:

receiving means to receive a call from the alternative network;

transmitting means to transmit a call to the alternative network;

means for performing network signaling;

means for performing speech and data coding;

means for identifying a mobile subscriber; and charging-means for handling charging and accounting data used in the alternative network.

20. The alternative network gateway unit according to claim 19, further comprising:

means for dropping-back a call received from the alternative network back to the alternative network.

21. The alternative network gateway unit according to claim 19, wherein the alternative gateway is connected to at least one of a mobile services switching centre and a gateway mobile switching centre.

22. The alternative network gateway unit according to claim 19, wherein the alternative network gateway unit comprises part of at least one of a mobile services switching centre and a gateway mobile switching centre.

* * * * *

UNITED STATES PATENT AND TRADEMARK OFFICE
CERTIFICATE OF CORRECTION

PATENT NO.    : 6,381,459 B1  
DATED         : April 30, 2002  
INVENTOR(S)   : Norbert Gervens and Ola Melander It is certified that error appears in the above-identified patent and that said Letters Patent is hereby corrected as shown below:

<u>Column 2,</u>  
Line 23, replace "exemplary flowchart" with -- exemplary scenario --  
Line 45, replace "switching s centre" with -- switching centre --

Signed and Sealed this

Fourth Day of February, 2003

JAMES E. ROGAN  
*Director of the United States Patent and Trademark Office*